United States Patent Office 2,693,876
Patented Nov. 9, 1954

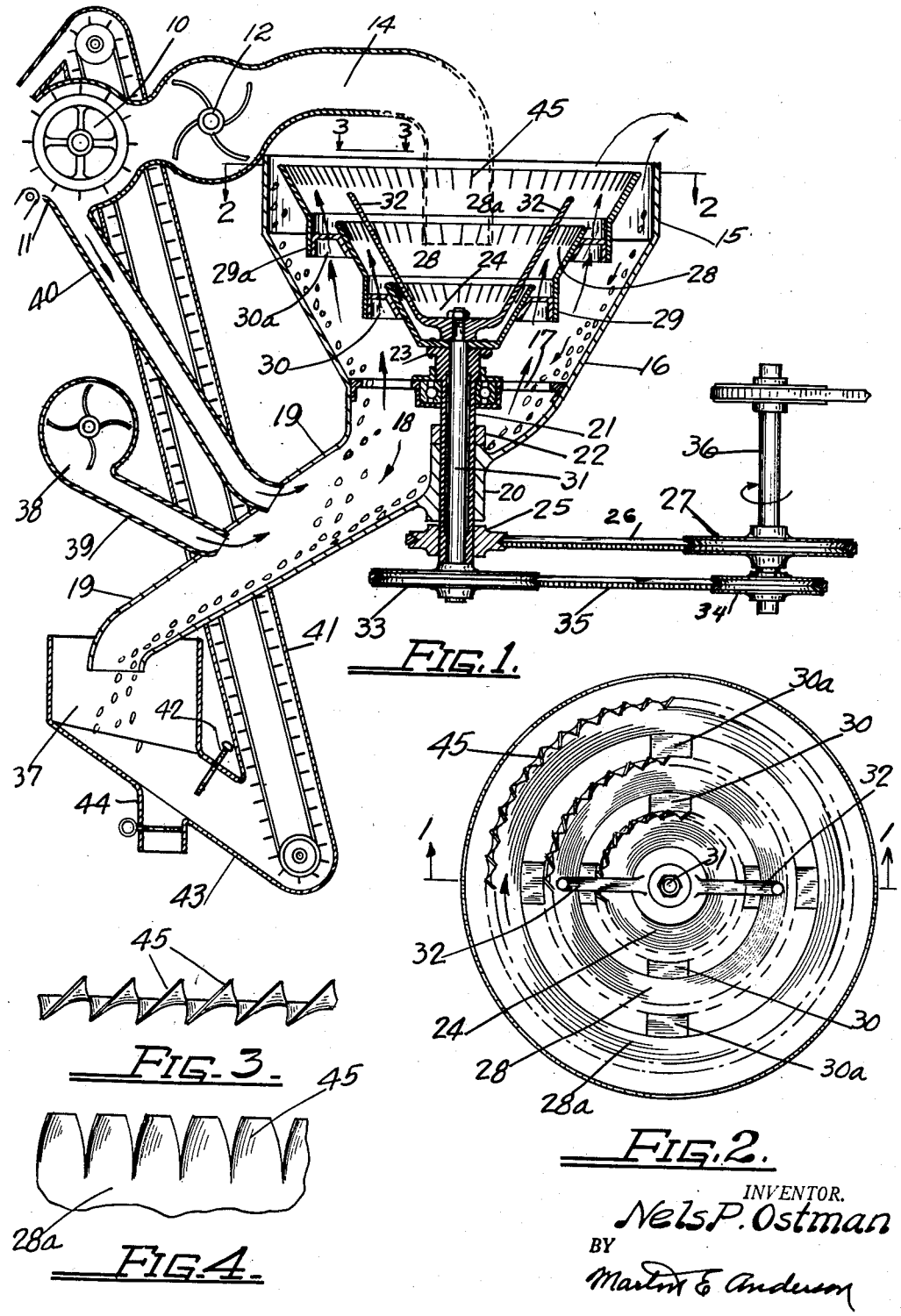

2,693,876

CENTRIFUGAL GRAIN CLEANER

Nels P. Ostman, Denver, Colo.

Application May 14, 1953, Serial No. 354,946

4 Claims. (Cl. 209—140)

This invention relates to improvements in harvesting machinery and has special reference to a centrifugal grain cleaner for use with combines.

On most large grain farms where grain such as wheat, rye, barley or oats are raised the harvesting is done by combines which cut the grain, thresh it, clean it and deliver the cleaned grain to sacks, the straw and chaff being usually broadcast over the fields.

Since combines are drawn over the fields by tractors and since grain fields are seldom level it is evident that the combines frequently tilt to one side or another. Combines of the usual type are minature threshing machines having a rotating cylinder for threshing the grain, and means comprising transverse sieves or screens and blowers for separating the grain from the straw and chaff. Where the screens or sieves are used on terrain that causes the combine to tilt to one side or the other the grain flows along the lower edge of the screens and the layer gets so thick that no cleaning action can take place.

It is the object of this invention to produce a grain cleaner for use with combines which will not be affected by the tilting of the combine and which will operate successfully on fields that are very uneven, and which in addition will make it possible to dispense entirely with the usual flat screens. The above and other objects that may hereinafter appear are attained by means of a construction and an arrangement of parts that will now be described in detail for which purpose reference will be had to the accompanying drawing in which the invention has been illustrated and in which:

Figure 1 is a view which is principally a diagrammatic representation of the several elements of a grain thresher and cleaner and in which the cleaner is a diametrical section taken in line 1—1, Fig. 2.

Figure 2 is a top plan view of the cleaner looking through plane 2—2, Fig. 1.

Figure 3 is a fragmentary top view of the serrated edge of one of the rotary separator elements; and Figure 4 is a side elevation looking upwardly in Figure 3.

Referring now to the drawing, reference numeral 10 designates the cylinder of the thresher of a combine, and 11 the concave which is usually provided with teeth similar to those used on the cylinder. Reference numeral 12 represents a beater and blower that serves to shake the grain from the straw and transfer it through tube 14 to the centrifugal cleaner that forms the subject of this invention and which will now be described.

The cleaner is attached to the combine by suitable means which have not been shown. The cleaner which forms a self contained unit consists of a sheet metal housing which has been shown as comprising a cylindrical zone 15 and a downwardly tapering frusto-conical portion 16 having a bottom 17 which has several large openings and which is of sufficient strength and rigidity to support a bearing to which reference will hereinafter be made. Attached to the lower end of wall 16 is a funnel-like conduit 19 whose function and relationship to the other parts will be made clear as the description proceeds.

The construction of the cleaner will now be described. Two bearings 18 and 20 are attached respectively to bottom 17 and the lower side of conduit 19. A tubular shaft 21 is mounted for rotation in bearings 18 and 20 and provided with means represented by collar 22 for preventing the shaft from moving in the direction of its axis. The upper end of shaft 21 has a flange 23 that supports a rotary cleaner assembly of which the pan-like member 24 is the lowermost one and which is attached to flange 23 by suitable means such as bolts. The lower end of shaft 21 carries a grooved pulley 25, that is connected by means of a V-belt 26 with the engine driven pulley 27. Sprocket wheels and chain may, of course, be substituted if desired. Positioned above pan 24 is a cleaner element having a frusto-conical surface 28 and a cylindrical wall 29. A plurality of spacer elements 30 connect wall 29 with the inclined wall 24 whose upper edge terminates approximately at the level of the juncture between 28 and 29.

Positioned above the intermediate cleaner element is an uppermost element which is larger but which has the same construction, namely a frusto-conical portion 28a and a cylindrical lower portion 29a. Spacers 30a connect the upper to the intermediate cleaner element. Since the cleaner elements must rotate at a fairly high speed bearings 18 and 20 must be rigidly attached to the body of the combine and the parts carefully balanced to reduce all wobble to a minimum. A shaft 31 is journaled in bearings in shaft 21 and has attached to its upper end a stirrer having two arms 32. Attached to the lower end of shaft 31 is a large belt pulley 33 that is connected with the smaller engine driven pulley 34 by means of a belt 35. Since the two shafts 21 and 31 are driven from shaft 36 by the motion transmission device shown they will turn in the same direction but at different speeds. Conduit 19 terminates above bin 37. A blower 38 is connected with conduit 19 by a tubular discharge duct 39 which directs a current of air upwardly in conduit 19. A conduit 40 serves to conduct grain that passes through the concave into conduit 19 and an elevator 41 serves to elevate grain and chaff from the bin and discharge it into the cylinder for rethreshing if this is found to be desirable.

A sliding valve 42 is provided in the outlet conduit 43 from the bin to the elevator and a take off valve 44 is provided above valve 42 so that the grain in the bin can be run into sacks if desired.

The present invention is directed in particular to the separator and cleaner which has been described above with the exception that no mention has been made to the serrated upper edges of members 24, 28 and 28a, and which have been designated by reference numeral 45 in Figures 3 and 4 it will be observed that a narrow zone along the top edges of members 24, 28 and 28a has been cut at equal intervals and separates into what will be designated teeth 45 and these have been twisted as shown in Figures 3 and 4. Referring to Figure 1 it will be seen that the tops of the outwardly flaring wall of members 24 and 28 terminate at or preferably slightly below the tops of the cylindrical lower edges 29 and 29a of members 28 and 28a, this is for the reason that any grain kernels that pass out between the teeth or over them will strike the cylindrical inner surfaces of zones 29, 29a and will thereupon be deprived of the vertical component that has caused them to move upwardly along the frusto-conical surface and will therefore fall down.

It is understood that during operation shafts 21 and 31 rotate in the same direction but at different speeds. Arms 32 loosen any chaff and straw and keep the machine from clogging. The straw, chaff and grain from the threshing cylinder are deposited into the center of the rotating cleaner and are subjected to the action of the resultant centrifugal force which is separated into vertical and diagonal components by the inclined rotating surfaces. Although it is believed preferable to have arms turn at a slightly slower speed the same result is obtained if they rotate faster; it is the relative rotation that is important.

The speed of rotation of the parts is so regulated that the force component parallel with the inclined surfaces of the rotor causes the grain to move upwardly. During the operation fan 38 is functioning and sends a strong current of air flowing upwardly through conduit 19 and out through the cleaning device and this carries the light chaff and the straw upwardly until they finally pass over the upper edge cylindrical zone 15 and are scattered over the surrounding ground surface.

Since the drawing merely represents the relationship of the several elements of the combination it is to be understood that the design shown is not to be construed as a shop drawing to be followed in all particulars. The invention illustrated and claimed herein is to be embodied in a properly engineered machine of sufficient strength and rigidity to withstand the strains and stresses to which the parts will be subjected in active operation. The bearings for the shafts are preferably grease packed and sealed anti-friction bearings.

A single frusto-conical cleaning element like the lowermost one will function to some extent but the effectiveness of the cleaning operation increases with the number.

What is claimed as new is:

1. A grain cleaner comprising, in combination, a housing open at the top, a shaft mounted in the housing for rotation about a vertical axis, a truncated upwardly flaring frusto-conical cleaning element having its truncated lower end secured to the upper end of the shaft for rotation therewith the upper edge of the cleaning element terminating below the upper edge of the housing in a serrated zone through which grain may pass, means for turning the shaft and cleaning element, means for depositing a mixture of grain and chaff into the cleaning element, a downwardly ranging conduit having its upper end in communication with the housing for receiving grain that has been discharged from the rotating cleaning element, and means comprising a fan for directing an upwardly flowing air current in the conduit and into the housing to remove chaff and similar light material therefrom.

2. A device in accordance with claim 1 in which the shaft is tubular and in which another shaft is journaled therein for relative rotating therewith, means for effecting relative rotation between the shafts and stirrer arms attached to the upper end of said second shaft for aggitating the material in the cleaning element.

3. A device in accordance with claim 2 in which the second shaft is rotated in the same direction as the tubular shaft but at a different angular speed.

4. A device in accordance with claim 3 in which the rotating cleaning element is formed from at least two coaxial frusto conical sections, the diameter of the lower end of an upper section being greater than the diameter of the top of the next lower section and extends below the latter, whereby an annular opening is provided between the sections through which air may flow.

References Cited in the file of this patent

UNITED STATES PATENTS

| Number | Name | Date |
|--------|------|------|
| 343,649 | Rippin | June 15, 1886 |
| 530,445 | Newby | Dec. 4, 1894 |
| 952,459 | Meyer | Mar. 22, 1910 |

FOREIGN PATENTS

| Number | Country | Date |
|--------|---------|------|
| 114,442 | Australia | Jan. 15, 1942 |